United States Patent
Chen et al.

(10) Patent No.: US 9,377,957 B2
(45) Date of Patent: Jun. 28, 2016

(54) METHOD AND APPARATUS FOR LATENCY REDUCTION

(71) Applicant: Marvell World Trade Ltd., St. Michael (BB)

(72) Inventors: Shawn Chen, San Jose, CA (US); Wei Jiang, Fremont, CA (US); Lin Chen, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 116 days.

(21) Appl. No.: 14/174,449

(22) Filed: Feb. 6, 2014

(65) Prior Publication Data

US 2014/0229641 A1 Aug. 14, 2014

Related U.S. Application Data

(60) Provisional application No. 61/763,750, filed on Feb. 12, 2013.

(51) Int. Cl.
| | | |
|---|---|---|
| *G06F 13/12* | (2006.01) | |
| *G06F 13/38* | (2006.01) | |
| *G06F 13/00* | (2006.01) | |
| *G06F 15/173* | (2006.01) | |
| *G06F 3/06* | (2006.01) | |
| *G06F 13/42* | (2006.01) | |
| *G06F 13/16* | (2006.01) | |

(52) U.S. Cl.
CPC ............ *G06F 3/0613* (2013.01); *G06F 3/0655* (2013.01); *G06F 3/0683* (2013.01); *G06F 13/1684* (2013.01); *G06F 13/4291* (2013.01)

(58) Field of Classification Search
None
See application file for complete search history.

(56) References Cited

U.S. PATENT DOCUMENTS

| | | | | |
|---|---|---|---|---|
| 7,177,385 | B2* | 2/2007 | Georgakos | G11C 8/04 327/202 |
| 8,598,908 | B1* | 12/2013 | Sullam | G06F 13/385 326/41 |
| 8,959,274 | B2* | 2/2015 | Le Goff et al. | 710/316 |
| 2011/0191548 | A1* | 8/2011 | Miller et al. | 711/153 |
| 2011/0280314 | A1* | 11/2011 | Sankaran et al. | 375/240.25 |
| 2012/0216080 | A1* | 8/2012 | Bansal et al. | 714/45 |
| 2012/0260067 | A1* | 10/2012 | Henry | G06F 9/30076 712/200 |

FOREIGN PATENT DOCUMENTS

| | | | |
|---|---|---|---|
| WO | WO 2011/094133 | A2 | 8/2011 |
| WO | WO 2011/094133 | A3 | 8/2011 |

OTHER PUBLICATIONS

International Search Report and Written Opinion issued Jun. 20, 2014 in PCT/US2014/015345.

* cited by examiner

*Primary Examiner* — Michael Sun

(57) ABSTRACT

Aspects of the disclosure provide an integrated circuit that includes a plurality of input/output (IO) circuits, an instruction receiving circuit and control circuits. The IO circuits are configured to receive a plurality of bit streams corresponding to an instruction to the integrated circuit. The instruction receiving circuit is configured to form the instruction from the plurality of bit streams. The control circuits are configured to operate according to the instruction.

18 Claims, 4 Drawing Sheets

METHOD AND APPARATUS FOR LATENCY
REDUCTION

INCORPORATION BY REFERENCE

This present disclosure claims the benefit of U.S. Provisional Application No. 61/763,750, "QSPI QUAD INSTRUCTION MODE" filed on Feb. 12, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, serial peripheral interface (SPI) bus is used for inter-chip communications. In an example, two integrated circuit (IC) chips are configured according to SPI bus technology and are connected by bus wires. One of the IC chips is configured in a master mode, and the other is configured in a slave mode. The master IC chip provides control signals, such as a clock signal, a select signal, and the like, to control the communication between the two IC chips.

SUMMARY

Aspects of the disclosure provide an integrated circuit that includes a plurality of input/output (IO) circuits, an instruction receiving circuit and control circuits. The IO circuits are configured to receive a plurality of bit streams corresponding to an instruction to the integrated circuit. The instruction receiving circuit is configured to form the instruction from the plurality of bit streams. The control circuits are configured to operate according to the instruction.

According to an aspect of the disclosure, the integrated circuit includes a memory array configured to store data at memory addresses. The plurality of IO circuits are configured to receive bit streams corresponding to an address in the memory array, and the control circuits are configured to read/write data at the address according to the instruction. In an example, the control circuits are configured according to the instruction that indicates a first number of IO circuits for receiving the address, and a second number of IO circuits for data input/output.

In an embodiment, the integrated circuit includes a register configured to store a first value indicative of a first configuration in which the IO circuits receive, in parallel, the bit streams corresponding to the instruction. The instruction receiving circuit is configured according to the first value in the register to form the instruction from the bit steams received in parallel. In an example, the register is configured to change from the first value to a second value in response to the instruction. The second value is indicative of a second configuration to use a different number of IO circuits for receiving a next instruction. The instruction receiving circuit is configured according to the second value indicative of a second configuration to use a different number of IO circuits for receiving a next instruction. In another example, the register is initialized to a value indicative of an initial configuration in which instructions are received by a specific IO circuit in a single bit stream, and the instruction receiving circuit is configured to form the instructions from a bit stream received by the specific IO circuit.

Aspects of the disclosure provide a method. The method includes receiving, by a plurality of input/output (IO) circuits of an integrated circuit, a plurality of bit streams corresponding to an instruction to the integrated circuit, forming, by an instruction receiving circuit, the instruction from the plurality of bit streams, and controlling control circuits in the integrated circuit to operate according to the instruction.

Aspects of the disclosure provide another integrated circuit. The integrated circuit includes a control circuit configured to generate a plurality of instruction bit streams corresponding to an instruction to another integrated circuit and a plurality of input/output (IO) circuits configured to output the plurality of instruction bit streams in order to send the instruction to the other integrated circuit.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
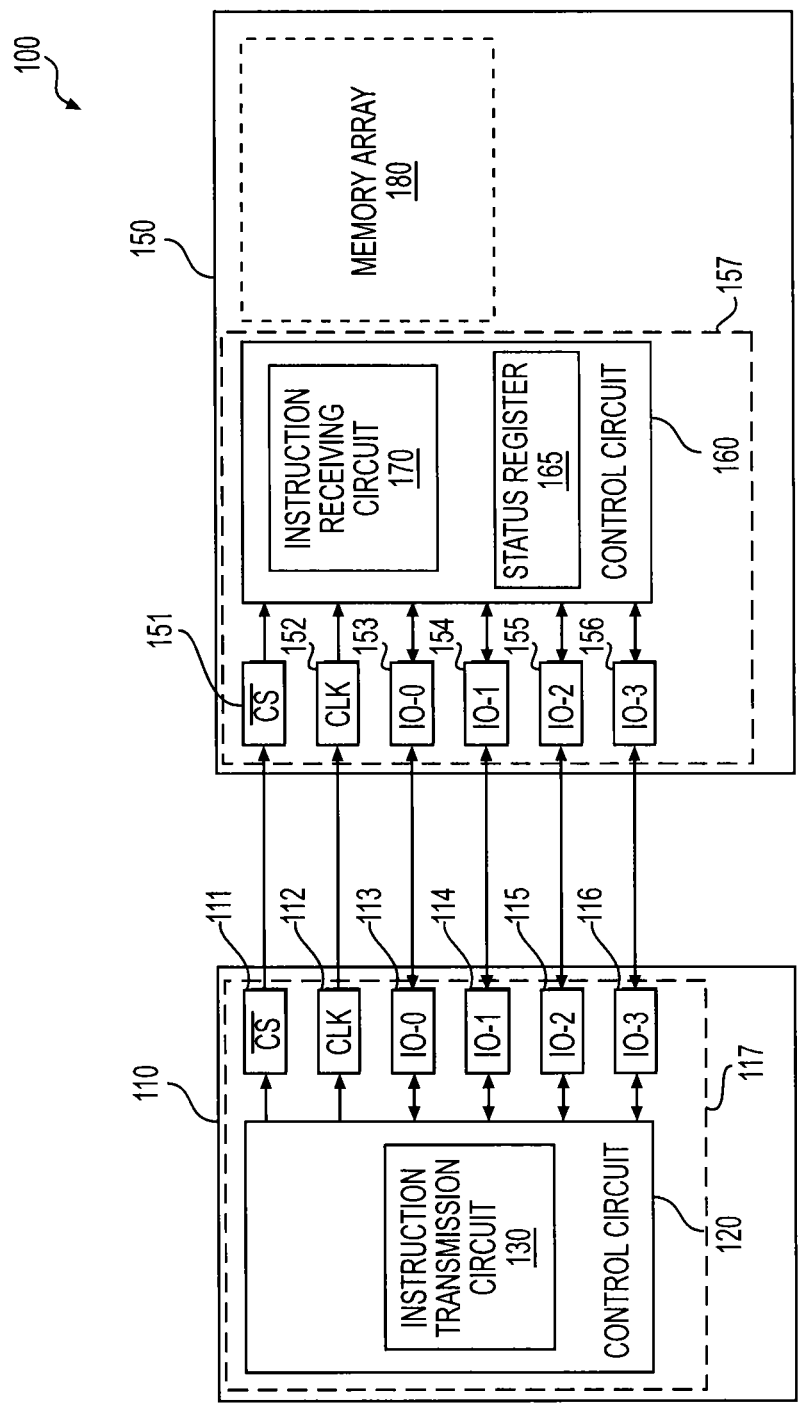
FIG. 1 shows a block diagram of a communication system 100 according to an embodiment of the disclosure.

FIG. 1 shows a block diagram of a communication system 100 according to an embodiment of the disclosure. The communication system 100 includes a first circuit 110 and a second circuit 150 coupled together using a modified serial peripheral interface (SPI) bus. The modified SPI bus is programmable and can be programmed to use a single wire or multiple wires for instruction transmission. When multiple wires are used for instruction transmission, the communication system 100 has a reduced latency; and when a single wire is used for instruction transmission, the communication system 100 is backwards compatible with other SPI bus technology.

The first circuit 110 and the second circuit 150 can be any suitably circuits that use the modified SPI bus technology for inter-circuit communication. In an embodiment, the communication system 100 is a chip communication system in which the first circuit 110 is a first integrated circuit (IC) chip and the second circuit 150 is a second IC chip. The first IC chip 110 includes a first interface 117 implemented using the modified SPI bus technology and the second IC chip 151 includes a second interface 157 implemented using the modified SPI bus technology. In an example, the two IC chips are assembled on a printed circuit board (PCB) and corresponding input/output (IO) pins of the two IC chips are coupled together by suitable conductive medium on the PCB, such as printed copper wires, vias, jumpers and the like.

Specifically, in an embodiment, the first interface 117 includes a plurality of input/output (IO) circuits 111-116, and a control circuit 120 coupled together as shown in FIG. 1. The IO circuits 111-116 are respectively configured for different signal input/output. For example, the IO circuit 111 is configured to input/output a chip select ($\overline{CS}$) signal, the IO circuit 112 is configured to input/output a clock (CLK) signal, the IO circuit 113 is configured to input/output a first information signal (IO-0), the IO circuit 114 is configured to input/output a second information signal (IO-1), the IO circuit 115 is configured to input/output a third information signal (IO-2), and the IO circuit 116 is configured to input/output a fourth information signal (IO-3).

Similarly, the second interface 157 includes a plurality of input/output (IO) circuits 151-156, and a control circuit 160 coupled together as shown in FIG. 1. The IO circuits 151-156 are respectively configured for different signal input/output. For example, the IO circuit 151 is configured to input/output a chip select (CS) signal, the IO circuit 152 is configured to input/output a clock (CLK) signal, the IO circuit 153 is configured to input/output a first information signal (IO-0), the IO circuit 154 is configured to input/output a second information signal (IO-1), the IO circuit 155 is configured to input/output a third information signal (IO-2), and the IO circuit 156 is configured to input/output a fourth information signal (IO-3).

The IO circuits 111-116 of the first circuit 110 and the corresponding IO circuits 151-156 of the second circuit 150 are suitably coupled together by printed copper wires, vias, jumpers and the like. According to an aspect of the disclosure, one of the first circuit 110 and the second circuit 150 is configured in a master mode and the other is configured in a slave mode. In the FIG. 1 example, the second circuit 150 is a memory device that includes a memory array 180 and suitable auxiliary circuits (not shown), and the first circuit 110 is a memory controller device that includes control logics (not shown) to control memory access to the second circuit 150. In the FIG. 1 example, the first circuit 110 is configured in the master mode and the second circuit 150 is configured in the slave mode. The first circuit 110 provides controls signals to control the communication between the first circuit 110 and the second circuit 150. For example, the first circuit 110 provides the chip select signal via coupled corresponding IO circuit pair (the IO circuits 111 and 151) to the second circuit 150.

In an embodiment, the first circuit 110 is coupled with the second circuit 150 and one or more other memory devices (not shown). The first circuit 110 provides respective chip select signals to the coupled memory devices, and share resources, such as the IO circuits 112-116 for the clock and information signals, among the coupled memory devices. In an example, when the chip select signal to the second circuit 150 is logic "0", the second circuit 150 is selected, and the information signals, such as instructions, addresses, data and the like, on the shared resources are for the second circuit 150; and when the chip select signal to the second circuit 150 is logic "1", the information signals on the shared resources are not for the second circuit 150.

Further, various information signals are communicated between the first circuit 110 and the second circuit 150, for example via the IO circuits 113-116 and 153-156. In the FIG. 1 example, instructions, addresses and data are communicated between the first circuit 110 and the second circuit 150. In an example, the first circuit 110 sends a configuration instruction to the second circuit 150 to cause the second circuit 150 to be configured accordingly. In another example, the first circuit 110 sends a write instruction with an address and data to the second circuit 150 to cause the data to be written into the memory array 180 at the address. In another example, the first circuit 110 sends a read instruction with an address to the second circuit 150 to cause the second circuit 150 to send back data stored at the address in the memory array 180.

The information signals can be communicated in various formats, such as a single bit stream on a single IO circuit pair, multiple bit streams on multiple IO circuit pairs, and the like. According to an aspect of the disclosure, the first interface 117 and the second interface 157 are respectively configured to enable such various formats.

Specifically, the control circuit 120 is configured to convert signal formats between internal circuits (not shown) of the first circuit 110 and input/output circuits, such as the IO circuits 113-116. In the FIG. 1 example, the control circuit 120 includes an instruction transmission circuit 130 configured to convert an internal format of an instruction to the second circuit 150 to a format that is receivable by the second IC chip 150. In an example, an instruction includes eight bits, and the internal circuits of the first IC chip 110 generate an instruction in the format of 8 parallel bits. When the first interface 117 is configured to transmit an instruction in the format of a single bit stream of 8 bits, the instruction transmission circuit 130 is configured to convert the format of the instruction from the 8 parallel bits to a single bit stream. When the first interface 117 is configured to transmit an instruction in the format of multiple bit streams, such as duo (two) bit streams, quad (four) bit streams, and the like, the instruction transmission circuit 130 is configured to convert the format of the instruction from the 8 parallel bits to multiple bit streams, such as duo bit streams, quad bit streams, and the like. It is noted that the first interface 117 also includes other suitable circuits (not shown) configured to convert address format and data format for example.

The control circuit 160 is configured to convert signal formats between internal circuits of the second IC chip 150 and the IO circuits 151-156. In the FIG. 1 example, the control circuit 160 includes an instruction receiving circuit 170 configured to convert a received format of an instruction to an internal format used by the internal circuits of the second IC chip 150. In an example, the internal circuits of the second IC chip 150 are configured to decode an instruction in the format of 8 parallel bits. When the IO circuits receive an instruction in the format of a single bit stream of 8 bits, the instruction receiving circuit 170 is configured to convert the format of the instruction from a single bit stream to 8 parallel bits; and when the IO circuits receive an instruction in the format of multiple bit streams, such as duo (two) bit streams, quad (four) bit streams, and the like, the instruction receiving circuit 170 is configured to convert the format of the instruction from multiple bit streams to 8 parallel bits.

According to an aspect of the disclosure, the instruction receiving circuit 170 has multiple modes, such as a single-bit instruction mode, a quad-bit instruction mode, and the like. For example, when the instruction receiving circuit 170 is in the single-bit instruction mode, the instruction receiving circuit 170 is configured to convert a single bit stream of 8 bits received by an IO circuit, such as the IO circuit 153, to the format of 8 parallel bits. When the instruction receiving circuit 170 is in the quad-bit instruction mode, the instruction receiving circuit 170 is configured to convert an instruction received by the IO circuits 153-156 in the format of four bit streams to the format of 8 parallel bits.

In the FIG. 1 example, the second interface 157 includes a status register 165 configured to store a value corresponding to a mode for the instruction receiving circuit 170, and the instruction receiving circuit 170 is configured according to the value stored in the status register 165. For example, when the status register 165 has a value of 0, the instruction receiving circuit 170 is configured in the single-bit instruction mode; and when the status register 165 has a value of 1, the instruction receiving circuit 170 is configured in the quad-bit instruction mode. It is noted that the status register 165 can be configured to store other suitable value corresponding to other suitable mode for the instruction receiving circuit 170.

According to an aspect of the disclosure, the second circuit 150 (e.g., the second IC chip) can be suitably programmed to operate with a memory controller who supports multiple bit streams for instructions, such as the first circuit 110 (e.g., the first IC chip), or another memory controller who does not support multiple bit streams for instructions and only uses single bit stream for instructions.

During operation, in an embodiment, when the second circuit 150 is powered up or is reset, the status register 165 is initialized to store a value corresponding to the single-bit instruction mode, and thus the instruction receiving circuit 170 enters the single-bit instruction mode. In an example, when the second circuit 150 is coupled with a memory controller that does not support multiple bit streams for instructions, the second circuit 150 is able to operate with the memory controller using single bit streams for instructions.

In the FIG. 1 example, after a reset of the second circuit 150, the first circuit 110 sends a configuration instruction to the second circuit 150 using a single-bit stream. The second circuit 150 is able to receive the configuration instruction, decode the configuration instruction, and be configured according to the configuration instruction. In an example, a specific configuration instruction causes the status register 165 to change to another value that corresponds to a multiple-bit instruction mode, thus the instruction receiving circuit 170 enters the multiple-bit instruction mode. Then, the first circuit 110 sends subsequent instructions to the second circuit 150 using multiple bit streams.

Further, in an example, when the instruction receiving circuit 170 is in the multiple-bit instruction mode, and the first circuit 110 decides to switch to using single bit stream for instructions, the first circuit 110 can send a specific configuration instruction using multiple instruction bit streams to the second circuit 150. The specific configuration instruction causes the status register 165 to change to the value that corresponds to the single-bit instruction mode, thus the instruction receiving circuit 170 enters the single bit instruction mode. Thus, the first circuit 110 can send a subsequent instruction to the second circuit 150 using a single instruction bit stream.

Figure 2:
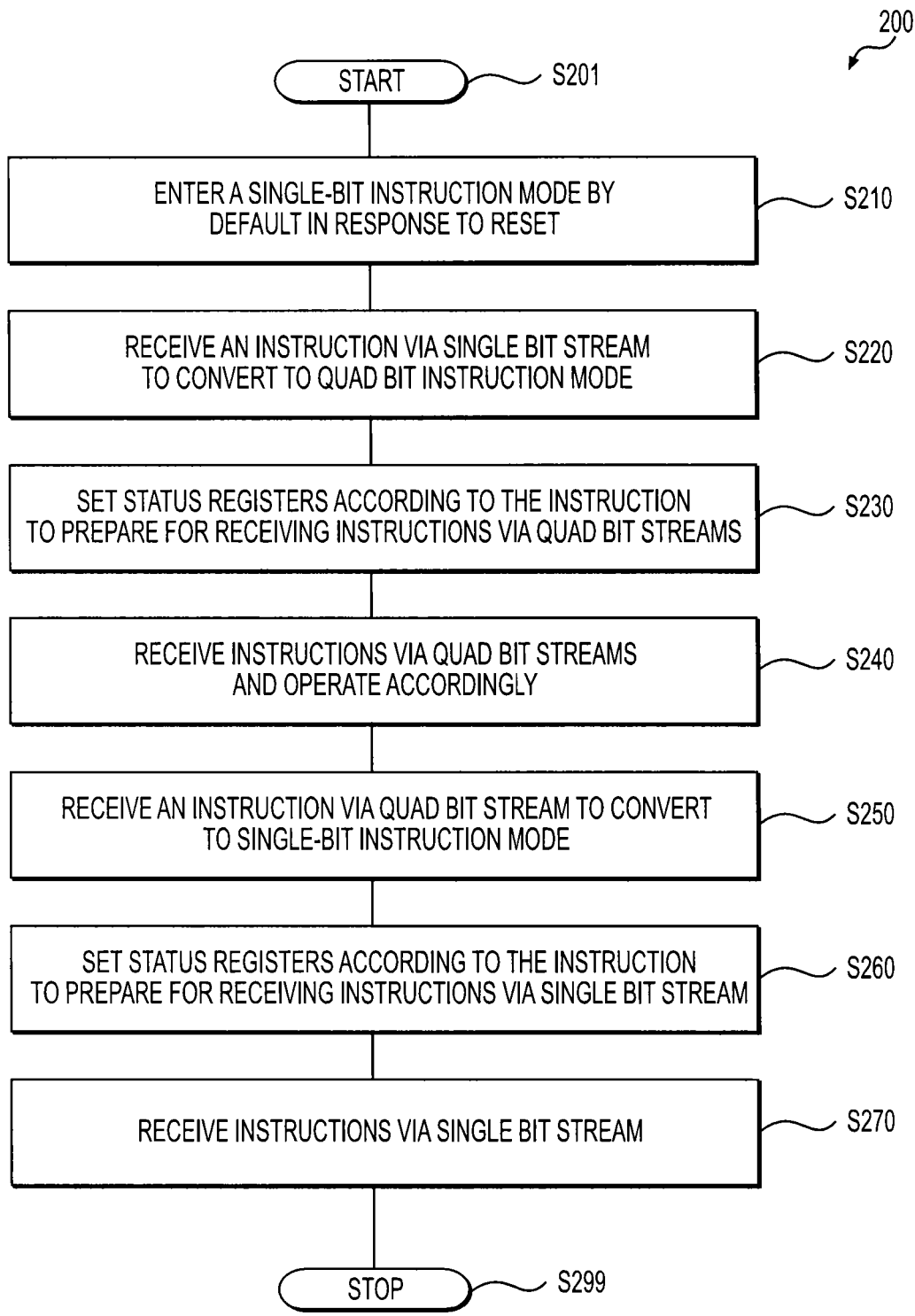
FIG. 2 shows a flow chart outlining a process example 200 according to an embodiment of the disclosure.

FIG. 2 shows a flow chart outlining a process example 200 for inter-chip communication. In an example, the process 200 is executed in the communication system 100.

At S210, a circuit enters a single-bit instruction mode by default in response to a reset. In the FIG. 1 example, in response to a reset or a power up of the second circuit 150, the status register 165 is initialized to store the value corresponding to the single-bit instruction mode. Thus, the instruction receiving circuit 170 enters the single-bit instruction mode, and the second circuit 150 is able to receive an instruction as a single-bit instruction stream, and operate according to the instruction.

At S220, the circuit receives a specific instruction via a single bit stream. The specific instruction instructs the circuit to convert to the quad-bit instruction mode. In the FIG. 1 example, at a time when the first circuit 110 decides to use quad bit streams to send instructions, the first circuit 110 sends a specific instruction to the second circuit 150 via a single bit stream. The specific instruction instructs the second circuit 150 to change to the quad-bit instruction mode in an example. The second circuit 150 receives the specific instruction.

At S230, the circuit sets registers according to the specific instruction to prepare for receiving instructions via quad-bit instruction streams. In the FIG. 1 example, the specific instruction causes the status register 165 to change to the value corresponding to the quad-bit instruction mode. Thus, the instruction receiving circuit 170 enters the quad-bit instruction mode.

At S240, the circuit is able to receive instructions via quad bit streams and operate according to the instructions. In the FIG. 1 example, when the instruction receiving circuit 170 enters the quad-bit instruction mode, the second circuit 150 is able to receive memory read/write instructions via quad bit streams, and operate according to the instructions. In an example, when an instruction is indicative of a memory write access using duo bit streams for address and quad bit streams for data, the second circuit 150 is configured to receive address in two bit streams and receive data in quad bit streams, and write the data into the address of the memory array 180. In another example, when an instruction is indicative of a read access using quad bit streams for address and duo bit streams for data, the second circuit 150 is configured to receive address in quad bit streams, read data from the address in the memory array 180, and send the data to the first circuit 110 in duo bit streams.

At S250, the circuit receives a specific instruction via quad bit streams. The specific instruction instructs the circuit to convert to the single-bit instruction mode. In the FIG. 1 example, for some reason, at a time the first circuit 110 decides to switch from using quad-bit instruction streams to using single bit instruction stream to send subsequent instructions, the first circuit 110 sends a specific instruction to the second circuit 150 via the quad bit streams first. The specific instruction instructs the second circuit 150 to change to the single-bit instruction mode. The second circuit 150 receives the specific instruction.

At S260, the circuit sets registers according to the specific instruction to prepare for receiving an instruction via a single-bit instruction stream. In the FIG. 1 example, the specific instruction causes the status register 165 to change to the value corresponding to the single-bit instruction mode. Thus, the instruction receiving circuit 170 enters the single-bit instruction mode.

At S270, the circuit is able to receive instructions via single bit streams and operate according to the instructions. In the FIG. 1 example, when the instruction receiving circuit 170 enters the single-bit instruction mode, the second circuit 150 is able to receive a memory read/write instruction via a single bit stream, and operate according to the instruction. In an example, when an instruction is indicative of a memory write access using duo bit streams for address and quad bit streams for data, the second circuit 150 is configured to receive address in two bit streams and receive data in quad bit streams, and write the data into the address of the memory array 180. In another example, when an instruction is indicative of a read access using quad bit streams for address and duo bit streams for data, the second circuit 150 is configured to receive address in quad bit streams, read data from the address in the memory array 180, and send the data to the first circuit 110 in duo bit streams. Then, the process proceeds to S299 and terminates.

It is noted that, in an example, at S270, when the second circuit 150 receives a specific instruction that instructs the second circuit 150 to convert to the quad-bit instruction mode, the process returns to S230. It is also noted that the single-bit instruction mode and the quad-bit instruction mode are used as examples, and the process 200 can be modified to use other suitable instruction transmission and receiving modes.

Figure 3:
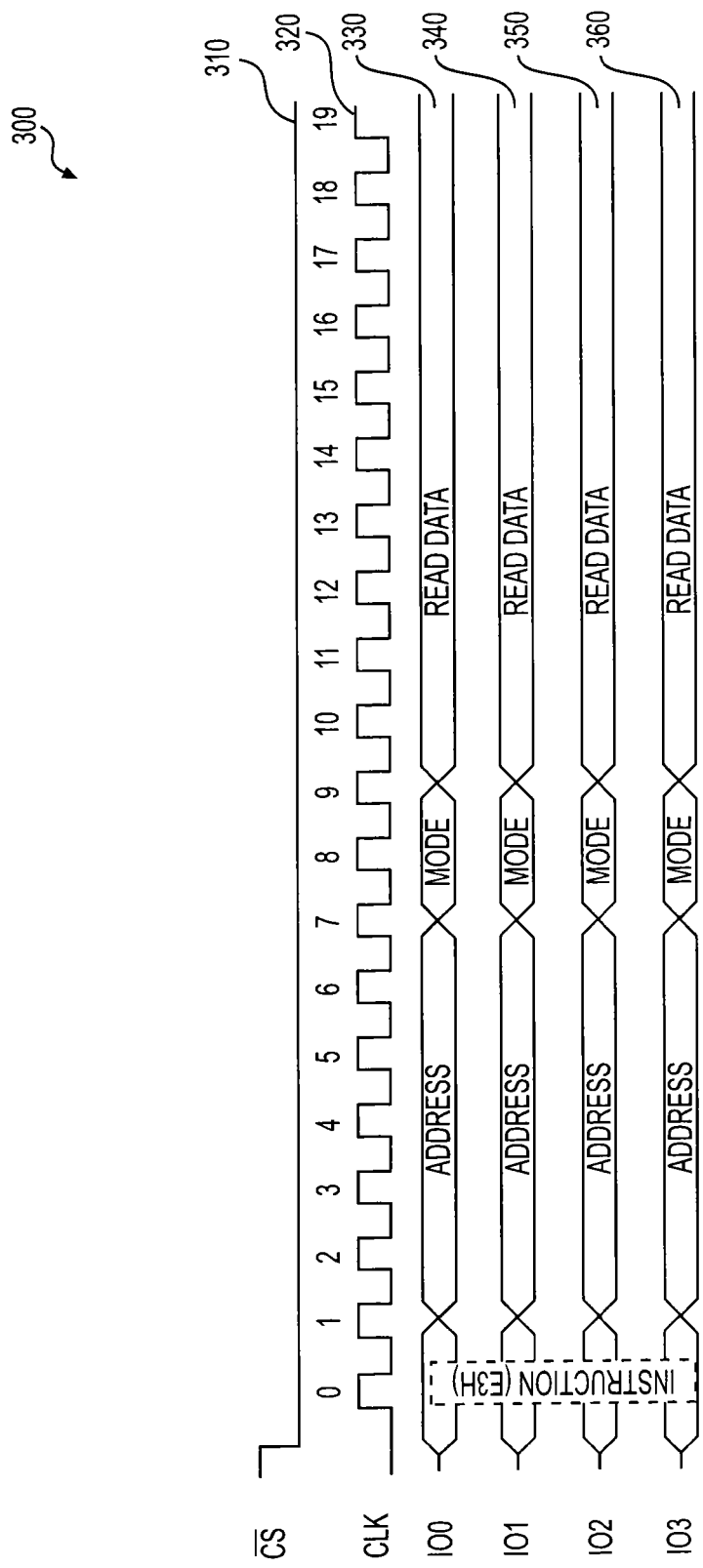
FIGS. 3 and 4 show plots of waveforms for comparison according to an embodiment of the disclosure.

FIG. 3 shows a plot 300 of waveforms for the communication system 100 according to an embodiment of the disclosure. The plot 300 includes a first waveform 310 for the chip select signal, a second waveform 320 for the clock signal, a third waveform 330 for the first information signal, a fourth waveform 340 for the second information signal, a fifth waveform 350 for the third information signal, and a sixth waveform 360 for the fourth information signal. The information signals can include information of instruction, address, mode, and data.

In the FIG. 3 example, a read instruction is sent from the first circuit 110 to the second circuit 150 using quad-bit streams in parallel to read data from an address in the memory array 180. The read instruction includes 8 bits, and can be sent by the IO circuits 113-116 and received by the IO circuits 153-156, in the format of four parallel bit streams using two clock cycles.

Figure 4:
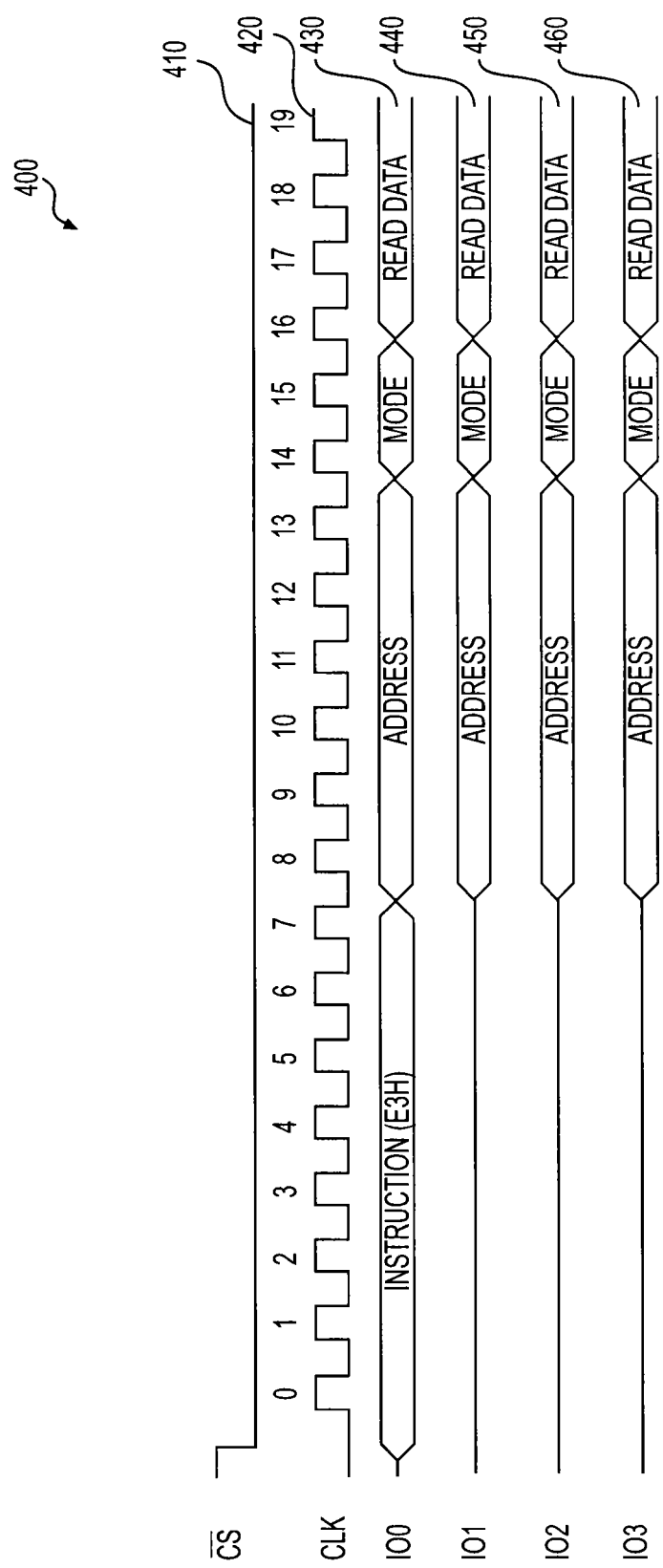

FIG. 4 shows a plot 400 of waveforms for the communication system 100 according to an embodiment of the disclosure. Similarly, the plot 400 includes a first waveform 410 for the chip select signal, a second waveform 420 for the clock signal, a third waveform 430 for the first information signal, a fourth waveform 440 for the second information signal, a fifth waveform 450 for the third information signal, and a sixth waveform 460 for the fourth information signal.

In the FIG. 4 example, the read instruction is sent by the IO circuit 113 and received by the IO circuit 153 in the format of a single-bit stream to read data from an address in the memory array 180. The 8 bits of the instruction are sent using eight clock cycles. Thus, by using the quad-bit instruction streams in the FIG. 3 example, it takes less time for the first circuit 110 to receive the data read back from the second circuit 150 comparing to using the single-bit instruction stream in the FIG. 4 example.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit, comprising:
   a plurality of input/output (IO) circuits to receive a plurality of bit streams corresponding to an instruction to the integrated circuit;
   an instruction receiving circuit to form the instruction from the plurality of bit streams;
   a register to store a value indicative of a configuration based on the instruction; and
   control circuits to operate according to the value indicative of the configuration so that a first number of IO circuits is used when the value is a first value and a second number of IO circuits is used when the value is a different second value.

2. The integrated circuit of claim 1, wherein:
   a memory array stores data at memory addresses;
   the plurality of IO circuits receive bit streams corresponding to an address in the memory array; and
   the control circuits read/write data at the address according to the instruction.

3. The integrated circuit of claim 2, wherein
   the control circuits are configured according to the instruction that indicates the first number of IO circuits for receiving the address, and the second number of IO circuits are for data input/output.

4. The integrated circuit of claim 1, wherein:
   the register stores the first value indicative of a first configuration in which the IO circuits receive, in parallel, the bit streams corresponding to the instruction; and
   the instruction receiving circuit forms, according to the first value in the register, the instruction from the bit steams received in parallel.

5. The integrated circuit of claim 4, wherein:
   the register changes from the first value to the second value in response to the instruction, and
   the instruction receiving circuit is configured according to the second value indicative of a second configuration to use a different number of IO circuits for receiving a next instruction.

6. The integrated circuit of claim 4, wherein:
   the register is initialized to the second value indicative of a second configuration in which instructions are received by a specific IO circuit in a single bit stream; and
   the instruction receiving circuit forms the instructions from a bit stream received by the specific IO circuit.

7. The integrated circuit of claim 6, wherein:
   the register changes from the second value to the first value in response to a specific instruction received by the specific IO circuit; and
   the instruction receiving circuit forms subsequent instructions from the bit streams received by the plurality of IO circuits.

8. A method, comprising:
   receiving, by a plurality of input/output (IO) circuits of an integrated circuit, a plurality of bit streams corresponding to an instruction to the integrated circuit;
   forming, by an instruction receiving circuit, the instruction from the plurality of bit streams;
   storing a value indicative of a configuration in a register that is based on the instructions;
   controlling control circuits in the integrated circuit to operate according to the value indicative of the configuration so that a first number of IO circuits is used when the value is a first value and a second number of IO circuits is used when the value is a different second value.

9. The method of claim 8, wherein:
   receiving two or more bit streams corresponding to an address in a memory array of the integrated circuit; and
   reading/writing data at the address in the memory array according to the instruction.

10. The method of claim 9, further comprising
    configuring the control circuits according to the instruction that indicates the first number of IO circuits for receiving the address, and a second number of IO circuits are for data input/output.

11. The method of claim 8, further comprising:
    storing, in the register, the first value indicative of a first configuration in which the instruction is received as the bit streams in parallel.

12. The method of claim 11, further comprising:
    changing, in the register, from the first value to the second value in response to the instruction;
    configuring the instruction receiving circuit according to the second value to use a different number of IO circuits for receiving a next instruction.

13. The method of claim 11, further comprising:
    initializing the register with the second value indicative of a second configuration in which instructions are received by a specific IO circuit; and
    forming the instructions from a bit stream received by the specific IO circuit.

14. The method of claim 13, further comprising:
    updating the register with the first value in response to a specific instruction received by the specific IO circuit; and configuring the instruction receiving circuit to form subsequent instructions from the bit streams received by the plurality of IO circuits.

15. An integrated circuit, comprising:
a control circuit to generate a plurality of instruction bit streams corresponding to an instruction to another integrated circuit; and
a plurality of input/output (IO) circuits to output the plurality of instruction bit streams in order to send the instruction to the other integrated circuit, where a value indicative of a configuration is stored in a register of the other integrated circuit based on the received instruction so that a first number of IO circuits is used when the value is a first value and a second number of IO circuits is used when the value is a different second value.

16. The integrated circuit of claim 15, wherein:
the control circuit generates a plurality of address bit streams corresponding to an address for a storage place in a memory array of the other integrated circuit; and
the plurality of IO circuits output the plurality of address bit streams in order to access the storage place in the memory array.

17. The integrated circuit of claim 15, wherein:
the control circuit generates a single instruction bit stream corresponding to a specific instruction after the other integrated circuit is initialized; and
an IO circuit outputs the single instruction bit stream in order to send the specific instruction to the other integrated circuit in order to configure the other integrated circuit to receive bit streams corresponding to subsequent instructions from the plurality of IO circuits.

18. The integrated circuit of claim 17, wherein:
the control circuit generates a plurality of instruction bit streams corresponding to a subsequent instruction; and
the plurality of IO circuits output the plurality of instruction bit streams in order to send the subsequent instruction to the other integrated circuit.

* * * * *